Aug. 21, 1934.        J. C. KORTICK        1,970,658
METHOD OF MAKING INSULATOR CAPS
Filed July 13, 1931      4 Sheets-Sheet 1
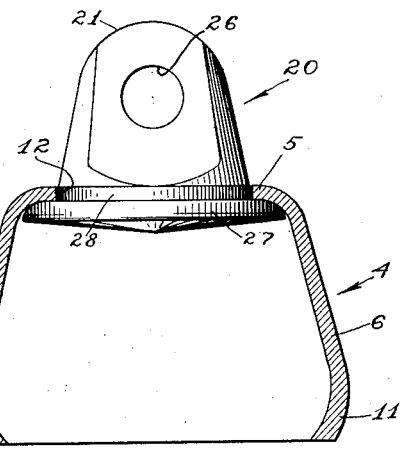
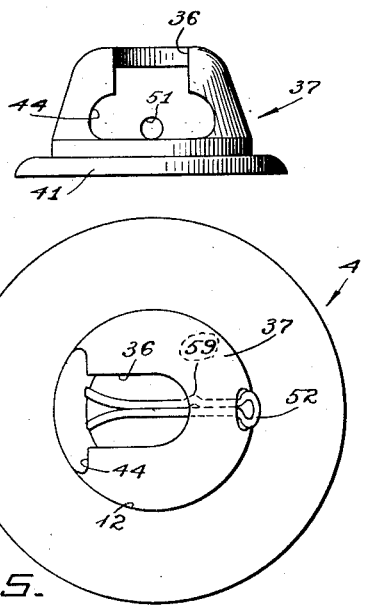
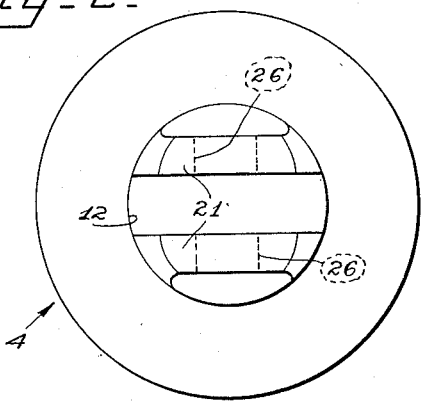
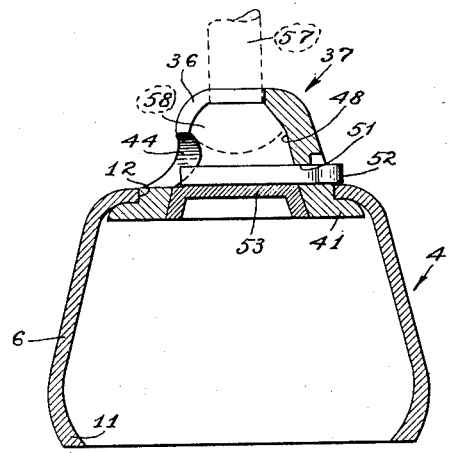
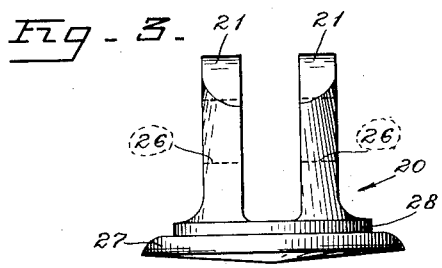
INVENTOR.
JOHN C. KORTICK.
BY
Munn & Co.
ATTORNEYS.

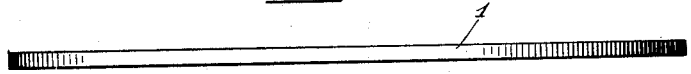
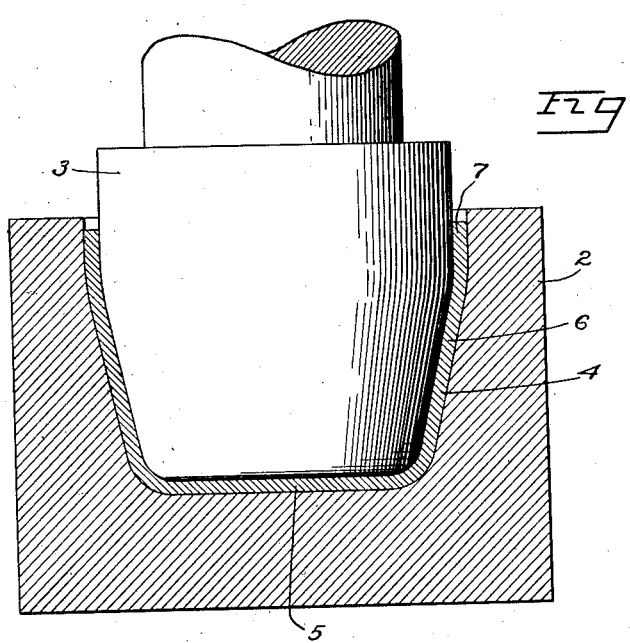
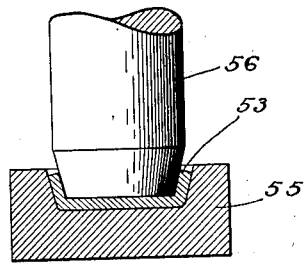
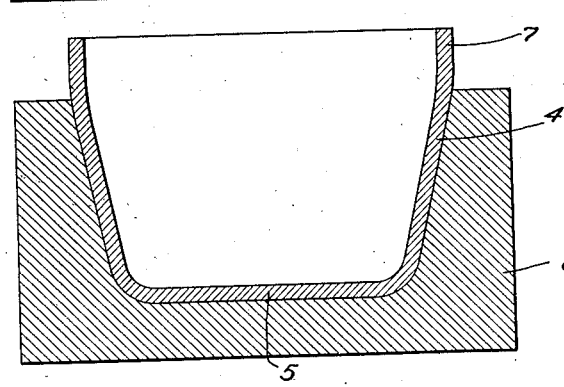
INVENTOR.
JOHN C. KORTICK.
BY Munn & Co
ATTORNEYS.

Aug. 21, 1934. J. C. KORTICK 1,970,658
METHOD OF MAKING INSULATOR CAPS
Filed July 13, 1931 4 Sheets-Sheet 3
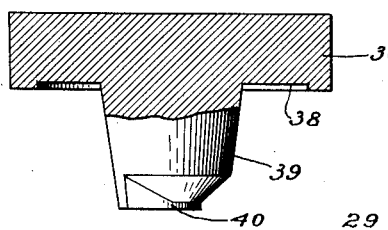
Fig. 12.
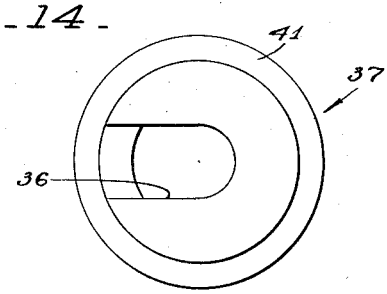
Fig. 14.
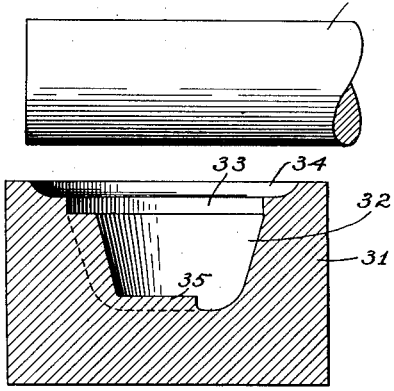
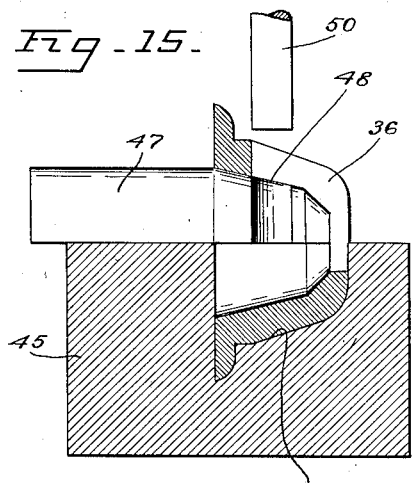
Fig. 15.
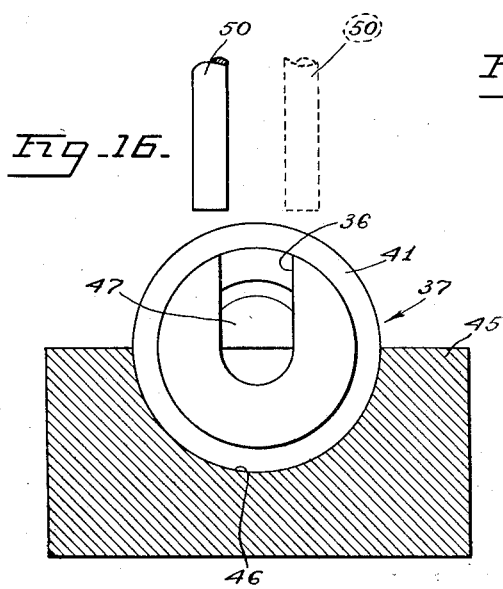
Fig. 16.
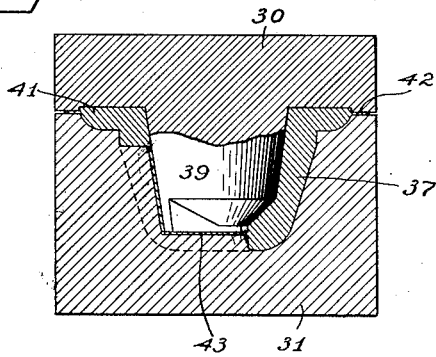
Fig. 13.
INVENTOR.
JOHN C. KORTICK.
BY
Munn & Co.
ATTORNEYS.

Aug. 21, 1934.  J. C. KORTICK  1,970,658
METHOD OF MAKING INSULATOR CAPS
Filed July 13, 1931      4 Sheets-Sheet 4
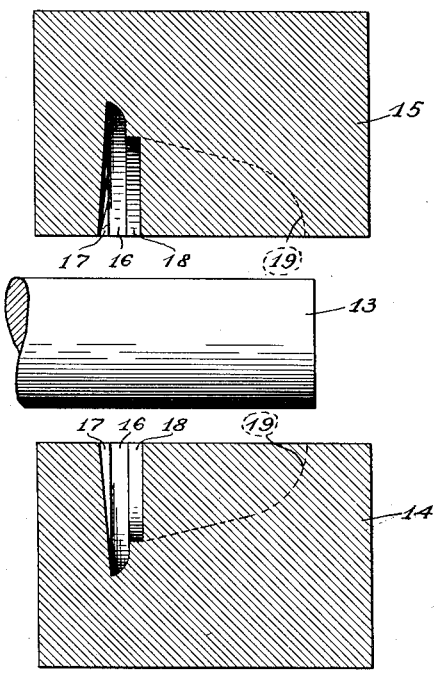
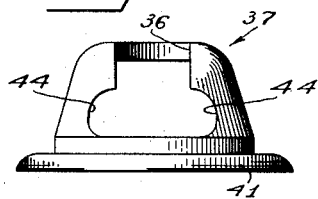
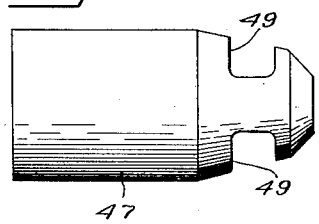
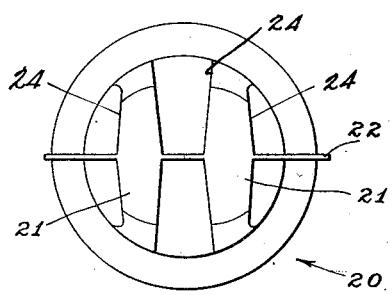
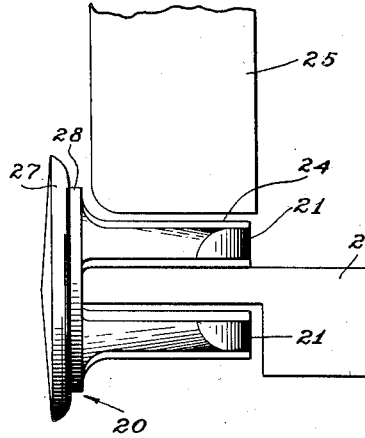
INVENTOR.
JOHN C. KORTICK.
BY
    Munn & Co
        ATTORNEYS.

Patented Aug. 21, 1934

1,970,658

UNITED STATES PATENT OFFICE 1,970,658

METHOD OF MAKING INSULATOR CAPS

John C. Kortick, San Francisco, Calif.

Application July 13, 1931, Serial No. 550,548

4 Claims. (Cl. 29—155.52)

My invention relates to improvements in a method of making insulator caps, and it consists in the steps hereinafter set forth.

An object of my invention is to provide an insulator cap and method of making insulator caps in which the cap is formed of two pieces comprising a bell and a head both of which may be drop-forged. The head is made in two different shapes and either head is securable to the bell and may be welded in place or otherwise secured for forming a permanent part of the cap. With this arrangement the manufacturer may have on hand a number of bells and a stock of both kinds of heads. This permits him to fill orders for insulator caps, employing one type of head or the other type of head, and saves the necessity of providing a complete stock of insulator caps using both types of heads.

By forming the insulator cap in two pieces it permits the device to be manufactured by drop-forging rather than by casting, and the resulting article is much stronger than a casting for the same amount of material used. Still a further advantage lies in the fact that the heads are provided with flanges that bear against the under surface of the bell top and thereby support the bell just as effectively as if the head were an integral part with the bell.

Novel steps are performed in the manufacture of the different parts forming the insulator cap and these steps will be described and claimed in the following specification.

Other objects and advantages will appear in the following specification, and the novel features of the device will be particularly pointed out in the appended claims.

My invention is illustrated in the accompanying drawings forming a part of this application, in which Figure 1 is a vertical section through the insulator cap showing one type of head in elevation;

Figure 2 is a top plan view of Figure 1;

Figure 3 is a view of the head shown in Figures 1 and 2 looking at the head at right angles;

Figure 4 is a vertical section through the insulator cap showing the other type of head used;

Figure 5 is a top plan view of Figure 4;

Figure 6 is an elevation of the second type of head showing it at right angles to that illustrated in Figures 4 and 5;

Figure 7 shows a disc for forming the bell;

Figures 8 and 9 show two of the steps in forming the bell;

Figure 10 shows a disc for forming a plug used in the second head;

Figure 11 shows the step in forming the plug;

Figures 12 to 17 (with the exception of Figure 14) show the dies and illustrate the steps in forming the second head;

Figures 14 and 18 show the partially completed second head in two different stages of manufacture;

Figure 19 shows the dies for forming the first head;

Figure 20 shows the partially completed head; and

Figure 21 shows the dies for finally shaping the head.

In carrying out my invention I will first describe how the bell is formed and will then describe the steps taken in forming the head shown in Figures 1, 2 and 3 and will follow this by the steps taken in forming the head shown in Figures 4, 5 and 6.

In Figures 7, 8 and 9 I show the steps for forming the bell and it will be noted that a disc 1 (see Figure 7) of the proper diameter and thickness is placed over a female die 2 (see Figure 8). The disc is approximately 8 inches in diameter for the type of bell shown in Figure 1 and is preferably $\frac{3}{16}$ of an inch thick. I do not wish to be confined to any exact measurements because these can be changed for different types of work. A male die 3 is placed in a drop-forging hammer or drawing press not shown and forces the disc 1, which has been previously heated, into a bell shape 4 shown in Figure 8. The bell 4 has a bottom 5 which subsequently becomes the top when the bell is actually in use, a conical side 6 and a portion 7 which extends paralell with the axis of the die 3.

The bell 4 after being shaped in the manner shown in Figure 8 is placed in a second female die 8 (see Figure 9) and a cooperating die 9 having a recess 10 is forced down on the portion 7 which projects from the die 8 and bends this portion inwardly at 11 as shown in Figure 1. This causes the edge of the bell to be thicker than the side 6. The bell is now removed from the second die 8 and an opening 12 is cut or punched in the top 5. These operations complete the construction of the bell 4.

In forming the head shown in Figures 1, 2 and 3 reference is made to Figures 19, 20 and 21. A bar 13 of round steel is placed between cooperating dies 14 and 15 (see Figure 19). The bar is preheated before being placed between the dies 14 and 15. The dies are identical in construction and each has a semi-circular recess 16 with a conical portion 17 having a ten degree pitch. Each die has also a second semi-circular recess 18 communicating with the recesses 16 and 17. Recesses 19 are also formed in the dies 14 and 15 and there are two of these recesses and these project at right angles to the recesses 16, 17 and 18 that form the base of the head 20 shown in Figure 3. The recesses 19 in each die cooperate for forming two ears 21 on the head 20. The side walls of the recesses 19 are given a seven degree pitch so as to be effective in forging the ears 21 out of the bar 13.

The portion of the bar disposed between the dies is shaped into the head 20 shown in Figure 20. A flashing 22 remains on the product after it is removed from the dies 14 and 15 and this flash is trimmed off. A number of blows of the die 15 down on the die 14 are necessary to form the head in the manner shown in Figure 20.

After the flashing 22 has been removed the head 20 is placed on an anvil die 23 shown in Figure 21, this die passing between the ears 21. The seven degree sloping sides of the ears 21 are shown at 24. A hammer 25 cooperates with the anvil 23 for flattening the sloping sides 24 on the top ear. After these sides have been flattened the head 20 is rotated through 180 degrees and the slanting portions 24 on the other ear 21 are flattened. The resulting structure is shown in Figure 3 and the head is now complete except for the boring or punching of openings 26 in the ears 21. It should be noted that the base of the head 20 has a flange 27 that extends beneath the bell 4 when the head is assembled to the bell and the head also has a portion 28 that closes the opening 12 in the bell. The head 20 may be spot welded or otherwise secured to the bell 4. The resulting article is a complete insulator cap having a head with ears 21.

I will now describe how the second head, i. e. the one shown in Figures 4, 5 and 6, is made. A bar of metal 29 (see Figure 12) is heated and is placed between a male and female die 30 and 31 respectively. The die 31 has a recess 32 with a conical shaped wall, this wall merging into a peripheral portion 33 whose surface is parallel with the axis of the die. An annular recess 34 extends from the portion 33. It will be noted also from Figure 12 that a central inwardly extending rib 35 extends from the middle of the recess 32 and up along the side to the portion 33. The width of the rib 35 is equal to the width of a slot 36 formed in the head 37 by the rib. The die 30 has an annular recess 38 registering with the recess 34 and a depending portion 39 having a projection 40 cooperating with the rib 35, this portion practically abutting the rib when the dies 30 and 31 are moved together. The portion of the rib 35 extending along the side of the recess 32 cooperates with the depending portion 39 to form the part of the slot 36 that extends along the side of the head 37.

The placing of the heated bar 29 between the dies 30 and 31 and the moving of the die 30 down upon the die 31 in a series of blows will change the bar 29 into the head 37, except that there will be a flashing 42 (see Figure 13) extending around the base 41 of the head and a flashing 43 covering the opening 36 in the cap. The flashings 42 and 43 are removed as soon as the head 37 is taken from the dies and the device is now ready to have the recesses 44 formed therein (see Figure 18).

A die 45 (see Figures 15 and 16) has a recess 46 shaped for receiving one-half of the head 37. The head is positioned so that the slot 36 extends upwardly. An anvil 47 is moved into the upper half of the recess 48 in the head 37 and Figure 17 shows the anvil provided with two slots 49. After the anvil 47 is in place, a punch 50 (see Figure 16) is positioned so as to remove a portion 44 in the head 37 and to pass through one of the slots 49.

The die 45 is now moved to the left with respect to the punch 50 or the punch is moved into the dotted line position with respect to the head 37 (see Figure 16) and then the punch is again forced into the head 37 and will remove the other portion 44, the punch passing through the other slot 49 during this movement. The anvil 47 may now be removed from the head 37 and the head in turn removed from the die 45. The head 37 will now take the shape as shown in Figure 18.

An opening 51 for receiving a cotter pin 52 is now drilled in the head 37 and the head is complete and is ready to be secured to the bell 4. The recess 48 in the head 37 is closed by means of a plug 53 (see Figure 4). The forming of the plug 53 is shown in Figures 10 and 11 and a disc 54 is used, having a diameter of approximately 2½ inches and being approximately ⅛ of an inch thick. The disc 54 is heated and placed over a die 55 and a forming die 56 cooperates with the die 55 in forming the disc into the plug 53. The plug 53 is inserted in the head 37 and may be welded in place if desired. Prior to the cotter pin 52 being inserted in the opening 51 a supporting pin 57 having a head 58 is passed between the recesses 44 and the shank of the pin 57 extends through the slot 36. The pin 57 is now moved away from the bell and this causes the head 58 to be received in the top of the dome. The cotter pin 52 is now inserted and prevents the supporting pin 57 from being removed, because it prevents the head 58 from being lowered to such a point as to be freely passed out through the recess 44. With the cotter pin removed, the pin 57 can be freed from the dome without the necessity of swinging either the valve or the pin into an angular position with respect to the other.

The cotter pin 52 has a hump 59 (see Figure 5) which prevents the accidental falling out of the cotter pin from the opening 51. The bell 4 is secured to the head 37 by welding or other suitable means and the base 41 supports the bell in the same manner as the base 27 on the head 20.

It will be seen that the same bell 4 can be used with either of the heads 20 or 37. In each case the opening 12 in the bell 4 is closed and the bell itself is not only supported by the welding connection but also by the extending flanges or base portions 27 and 41 respectively.

The neck of a conventional insulator (not shown) is adapted to be mounted in the bell and secured to the latter by cement or the like. The inwardly crimped end of the bell prevents withdrawal of the insulator after the cement hardens.

The device is extremely simple in construction and is stronger than a casting of similar dimensions.

I claim:

1. The herein described steps in the process of making an insulator cap head which consists in shaping a bar by drop-forging to form an annular flange and a dome-shaped head rising therefrom with a slot extending from the top of the dome down along its side, in seating a circumferential portion of the shape thus obtained in a cup member with the slot presented upwardly, in introducing a supporting member into the projecting portion of the shape, the said member leaving certain portions of the wall adjacent the slot unsupported and in removing said portions of the wall.

2. The herein described method of forming a bell adapted to receive an insulator neck which consists in forming a cup-shaped member, in uniformly bending the marginal portion of the cup inwardly whereby the outer edge of the end face is made to project axially beyond the inner edge and the end face is made frusto-conical and in reshaping the end face by axially compressing the outer edge and forcing the end material into a straight transverse plane whereby the material in the immediate proximity of said plane is thickened.

3. The herein described steps in the process of making an insulator cap head which consists in symmetrically forging a bar from opposite sides to form a disc-shaped base and spaced ears projecting therefrom, the ears having sections tapering from an axial plane toward the edges so as to present thin edges and heavy central portions, and in subsequently flattening the ears.

4. The herein described steps in the process of making an insulator cap head which consists in symmetrically forging a bar from opposite sides to form a disc-shaped base and spaced ears projecting therefrom, the ears having sections tapering from an axial plane toward the edges so as to present thin edges and heavy central portions, and in introducing an anvil between the ears and in flattening the ears against the anvil.

JOHN C. KORTICK.